(12) United States Patent
Burzio

(10) Patent No.: US 7,200,477 B2
(45) Date of Patent: Apr. 3, 2007

(54) DRIVER-AID METHOD AND DEVICE FOR SHIFTING GEARS IN AN AUTOMATIC TRANSMISSION

(75) Inventor: Gianfranco Burzio, Orbassano (IT)

(73) Assignee: C.R.F. Societa Consortile per Azioni (IT)

( * ) Notice: Subject to any disclaimer, the term of this patent is extended or adjusted under 35 U.S.C. 154(b) by 208 days.

(21) Appl. No.: 11/074,215

(22) Filed: Mar. 7, 2005

(65) Prior Publication Data

US 2005/0202932 A1    Sep. 15, 2005

(30) Foreign Application Priority Data

Mar. 5, 2004   (EP)   .................................. 04425145

(51) Int. Cl.
*G06F 7/00*   (2006.01)
(52) U.S. Cl. ........................ 701/52; 701/56; 74/473.18
(58) Field of Classification Search ............ 701/50–58; 74/473.1, 473.18, 473.21, 473.3
See application file for complete search history.

(56) References Cited

U.S. PATENT DOCUMENTS

| 5,425,686 A | 6/1995 | Grange ........................ 477/79 |
| 5,847,344 A | * 12/1998 | Denyer et al. ........... 200/61.88 |
| 5,865,705 A | * 2/1999 | Shamoto et al. .............. 477/79 |
| 6,053,066 A | 4/2000 | Ishii et al. ............... 74/473.18 |
| 6,474,186 B1 | 11/2002 | Vollmar ........................ 74/335 |

FOREIGN PATENT DOCUMENTS

| DE | 10105491 A1 | 2/2001 |
| DE | 10054313 | 5/2002 |
| EP | 0519528 | * 12/1992 |

OTHER PUBLICATIONS

English translation of German patent application No. DE 10105491 A1 cited in the European Search Report dated Aug. 10, 2004 which was submitted with original filing of instant application.
European Search Report for EP 04425145 dated Aug. 10, 2004.

* cited by examiner

*Primary Examiner*—Richard M. Camby
(74) *Attorney, Agent, or Firm*—Ostrolenk, Faber, Gerb & Soffen, LLP

(57) ABSTRACT

A driver-aid method for shifting gears in an automatic transmission, wherein an automatic operating mode of the automatic transmission provides for shifting automatically by means of an optimization strategy based on information signals. Manual shifting of the gears of the vehicle by means of a control device is permitted even in automatic operating mode: a) if the shift requested manually by the driver is compatible with the set optimization strategy, a physical return is transmitted to the driver informing the driver of the compatibility of the shift requested; and b) if the shift requested manually by the driver is not compatible with the set optimization strategy, a physical return is transmitted to the driver informing the driver of the incompatibility of the shift requested.

8 Claims, 1 Drawing Sheet

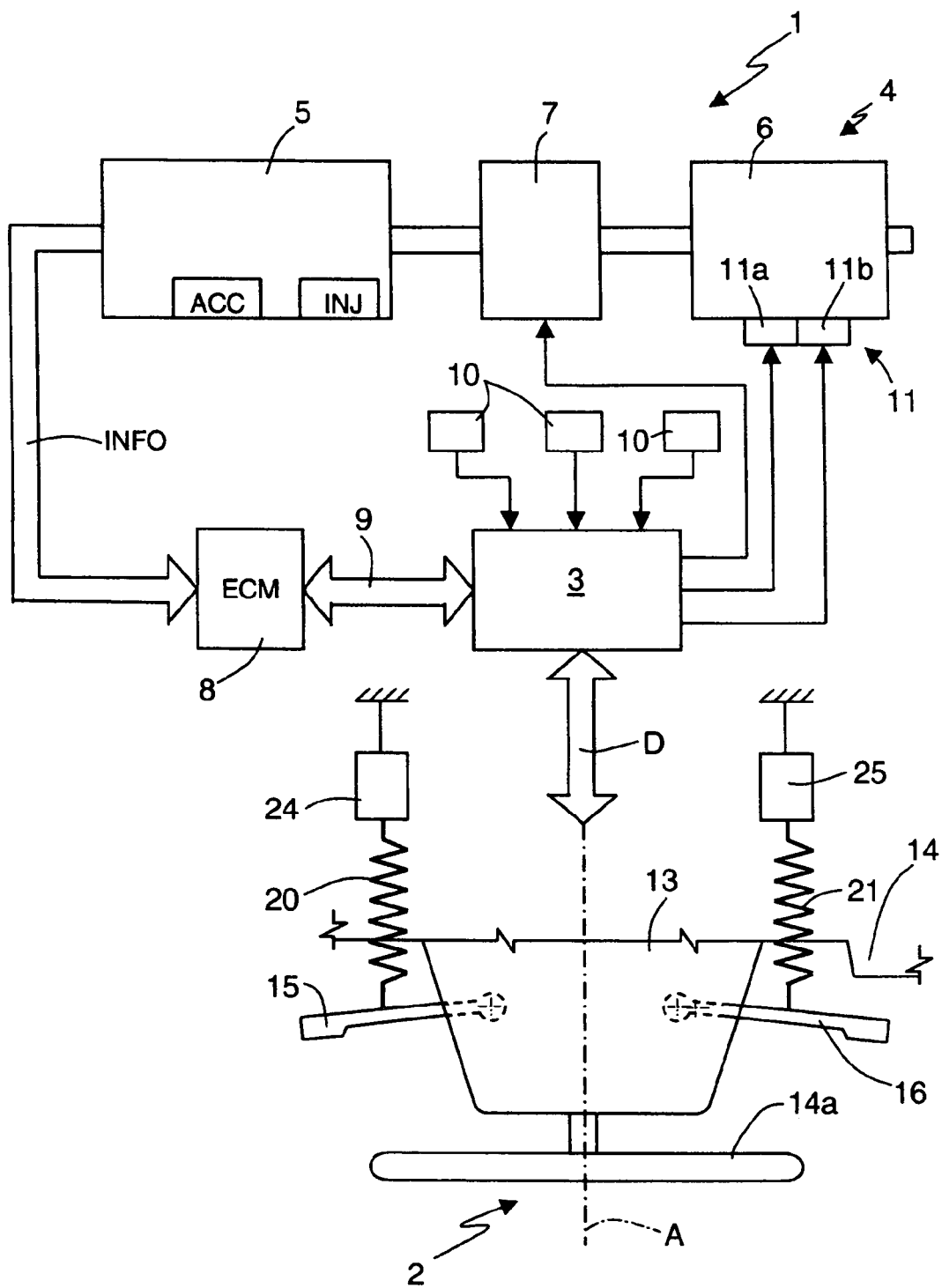

DRIVER-AID METHOD AND DEVICE FOR SHIFTING GEARS IN AN AUTOMATIC TRANSMISSION

BACKGROUND OF THE INVENTION

1. Field of the Invention

The present invention relates to a driver-aid method and device for shifting gears in an automatic transmission.

2. Related Art

As is known, vehicles with automatic transmissions are equipped with driver shift control devices on the driver's side.

For example, control devices are known comprising one or more levers enabling sequential shift of the automatic transmission by the driver, while others simply comprise manually operated buttons (normally two).

The control devices also provide for setting an automatic operating mode, in which shift is performed automatically by an automatic control according to a given optimization strategy.

Automatic transmissions of the above type normally also permit manual shift, even when an automatic shift strategy is operative.

In this case, however, the automatic shift strategy intervenes regardless, and the driver may only "anticipate", but never prevent or delay, an automatic control strategy shift.

There is also a fully manual operating mode, in which shift is controlled fully independently by the driver, and automatic shift only comes into play in extreme situations, e.g. to prevent damage to the engine (engine speed too high) or to prevent the engine stalling (engine speed too low).

SUMMARY OF THE INVENTION

It is an object of the present invention to provide a driver-aid method and device for shifting gears in an automatic transmission, which indicates to the driver the compatibility of a manual shift with a pre-set, currently operating optimization strategy.

According to an aspect of the present invention, there is provided a driver-aid device for shifting gears in an automatic transmission, including a control system which controls said automatic transmission, and which provides for an automatic operating mode of the automatic transmission wherein shifting is performed automatically by means of an optimization strategy based on information signals;

a control device being provided for manually shifting the gears on the vehicle;

including a device which scrutinizes the shift requested by the driver by means of said control device:

if the shift requested manually by the driver is compatible with the set optimization strategy, a first signal (S1) is generated to transmit a physical return to the driver informing the driver of the compatibility of the shift requested, and the proposed shift is performed upon operation of said control system; and if the shift requested manually by the driver is not compatible with the set optimization strategy, a second signal (S2) is generated to transmit a physical return to the driver informing the driver of the incompatibility of the shift requested, and the proposed shift is performed after operation of said control system.

BRIEF DESCRIPTION OF THE DRAWINGS

A non-limiting embodiment of the invention will be described purely by way of example with reference to the accompanying drawing, which shows a block diagram of an automatic power train featuring a gear shift driver-aid device in accordance with the teachings of the present invention.

DETAILED DESCRIPTION

Number 1 in the accompanying drawing indicates as a whole a gear shift driver-aid device, in which a gear shift control device 2 of an automatic transmission cooperates, via data exchange along a data line D, with an electronic central control unit 3 controlling an automatic transmission assembly 4.

Automatic transmission assembly 4 receives mechanical power from a shaft (not shown) of an internal combustion engine 5 (petrol or diesel fuel), and comprises a transmission 6, and a clutch 7 interposed between an output shaft of engine 5 and the input shaft of transmission 6 which supplies mechanical power to the wheels of a vehicle (not shown).

Engine 5 cooperates with an electronic engine control circuit 8 which receives a number of information parameters INFO (engine speed, cooling water temperature, etc.) measured on engine 5, and supplies control signals to an ignition system ACC (shown schematically) and to an injection system INJ (also shown schematically).

Electronic central control unit 3 cooperates with electronic engine control circuit 8, to which it is connected over a two-way data transmission line 9, and is also connected to sensors 10 for measuring parameters, such as vehicle speed, accelerator pedal position, and the pressure and temperature of a hydraulic circuit (not shown) supplying automatic transmission assembly 4.

Electronic central control unit 3 is also connected to an actuator control device 11 for controlling shift of transmission 6 and release/engagement of clutch 7 in known manner by means of respective actuator assemblies 11a, 11b (shown schematically).

More specifically, central control unit 3 supplies actuator assemblies 11a, 11b with signals to control:

up-shifting of transmission 6;

down-shifting of transmission 6;

shifting transmission 6 into reverse.

Central control unit 3 may also provide a conventional automatic operating mode of transmission assembly 4, whereby the shift strategy is optimized by shifting automatically on the basis of information signals (e.g. engine speed, accelerator pedal position, vehicle speed) with no manual control on the part of the driver. Electronic central control unit 3 may also provide a special operating level of transmission assembly 4 (a racing operating mode), wherein gear shifting and engagement of clutch 7 are performed rapidly to simulate racing-type manual operation of the transmission assembly. Further, electronic central control unit 3 may provide a semiautomatic operating mode, as described below.

Electronic central control unit 3 is connected to control device 2, which is fitted, for example, to a steering column control assembly 13 extending from the dashpanel 14 (shown partly and schematically) of the vehicle (not shown) and housing the steering column 17 of the vehicle (partly shown).

The steering column is fitted integrally at one end with a steering wheel 14a, which is located at one end of steering column control assembly 13, and is coaxial with a longitudinal axis A of the steering column.

Control device 2 comprises at least one lever 15, 16 operated by the driver to shift gear and to select the operating mode of transmission assembly 4 (automatic or semiautomatic). When semiautomatic operating mode is selected, lever 15, 16 also permits manual alteration of the automatic shift.

In the example shown, lever 15, 16 is also connected to steering column control assembly 13, but may obviously be located anywhere within the passenger compartment of the vehicle.

More specifically, in the example shown, a first and a second lever 15, 16 are fitted to steering column control assembly 13 to enable the driver of the vehicle (not shown) to control transmission assembly 4. Alternatively, the first and second lever 15, 16 may be fitted to steering wheel 14a.

More specifically, control device 2 generates signals which are interpreted by central control unit 3 to control transmission assembly 4, and in particular:

an up-shift signal UP to shift up, for example, one gear;
a down-shift signal DWN to down-shift, for example, one gear;
a neutral signal NTRL to shift transmission 6 into neutral; and
a reverse signal REV to shift transmission 6 into reverse.

The first and second lever 15, 16 also enable the driver of the vehicle to select (in known manner) a first and second operating mode of transmission assembly 4, known as automatic shift mode and semiautomatic shift mode respectively, by transmitting a SWITCH signal to electronic central control unit 3.

In semiautomatic shift mode, shifting of transmission 6 is performed manually by the driver by means of first and second lever 15, 16.

In automatic shift mode, shifting of transmission 6 is controlled entirely by electronic central control unit 3, which, as stated, implements a shift optimizing strategy to increase or decrease the transmission ratio (according to known optimization strategies) as a function of given input parameters, such as vehicle speed, accelerator pedal position, vehicle load, and/or slope of the road along which the vehicle is travelling, etc.

On receiving the SWITCH signal with the transmission assembly in semiautomatic shift mode, electronic central control unit 3 disables semiautomatic shift mode and enables automatic shift mode.

On receiving the SWITCH signal with transmission assembly 4 in automatic shift mode, electronic central control unit 3 disables automatic shift mode and enables semiautomatic shift mode.

First and second lever 15, 16 also enable the driver of the vehicle to select a first and second performance level of transmission assembly 4 by means of a PERF signal. More specifically, the first performance level, known as basic operating mode, allows the driver to select a first release/engage speed of clutch 7 and a first shift speed; and the second performance level, corresponding to racing operating mode, allows the driver to select a second release/engage speed of clutch 7 and a second shift speed. The first speed in basic operating mode is lower than the second speed in racing operating mode.

On receiving the PERF signal with transmission assembly 4 in basic operating mode, electronic central control unit 3 disables basic operating mode and enables racing operating mode; and, conversely, on receiving the PERF signal with transmission assembly 4 in racing operating mode, electronic central control unit 3 disables racing operating mode and enables basic operating mode.

When automatic operating mode is activated, in which shifting is performed automatically according to a predetermined known strategy, electronic central control unit 3 also permits manual up- or down-shifting.

When the above strategy is operative, however, the driver can only "anticipate", and never prevent or delay, an automatic optimization strategy shift.

The driver's "suggestion", however, is implemented by comparing the gear requested by the driver manually operating lever 15, 16 with the proposed (automatic strategy) gear, to determine (by known comparing operations) whether the requested shift is compatible with the set automatic optimization strategy.

More specifically:

if the shift requested manually by the driver is compatible with the set automatic shift strategy, a control signal $S_1$ for controlling control device 2 is generated whereby movement of one (or both) of levers 15, 16 involves very little effort, and, once the lever 15, 16 is moved, the shift is commanded and actually performed; and if the shift requested manually by the driver is not compatible with the set automatic shift strategy, a control signal $S_2$ for controlling control device 2 is generated whereby movement of one (or both) of levers 15, 16 involves greater effort, and, once the lever is moved, the shift is commanded and actually performed.

Alternatively, a device may be provided to vibrate lever 15, 16 in the presence of control signal $S_1$ (or $S_2$) and produce a tactile sensation immediately informing the driver that the proposed gear is compatible (or incompatible) with the set automatic optimization strategy.

A "physical" return (stiffening or vibration of the levers), i.e. a force feedback in reaction to action by the driver, is thus transmitted to the driver by means of levers 15, 16.

In the example shown, the driver realizes immediately when a shift is incompatible, by having to exert extra force to move lever/s 15, 16.

The driver may therefore push lever 15, 16 with a minimum amount of effort, when the shift is compatible; the lever yields, and the shift is performed. By exerting greater force on lever 15, 16, the shift may be performed at any time.

The above operating mode of lever 15, 16 provides for maximizing vehicle performance by telling the driver the right time to perform a given shift.

One possible physical embodiment, for example, may comprise a return spring 20, 21 on lever 15, 16, and, in series with spring 20, 21, an electromagnetic actuator 24, 25 which, when energized (in the presence of signal $S_2$), compresses the spring to increase the resistance to movement of lever 15, 16. Once lever 15, 16 is moved, the shift signal is generated.

Alternatively, a mechanism may be provided to preload return spring 20, 21 of the lever, and which is activated in the presence of signal $S_2$, with a shape-memory actuator (not shown).

In another embodiment, lever 15, 16 may move from a rest position to an intermediate semistable position (achieved in known manner, for example, by means of a ball held by a spring inside a seat—not shown), and from there to a final shift position by means of further manual control. As before, the stiffness of the spring is regulated to permit movement with a minimum amount of effort into the final position in the presence of signal $S_1$, and with greater effort in the presence of signal $S_2$.

If shift is button-controlled, tactile feedback may be by vibrating the button. In this mode, in fact, the driver tends to keep one finger (thumb or forefinger) on the button to shift rapidly, so that vibration indicates the right time to press the button according to the set optimization strategy.

The invention claimed is:

1. A driver-aid device for shifting gears in an automatic transmission, including a control system which controls said automatic transmission, and which provides for an automatic operating mode of the automatic transmission wherein shifting is performed automatically by means of an optimization strategy based on information signals;
   a control device being provided for manually shifting the gears on the vehicle;
   including a device which scrutinizes the shift requested by the driver by means of said control device:
   if the shift requested manually by the driver is compatible with the set optimization strategy, a first signal ($S_1$) is generated to transmit a physical return to the driver informing the driver of the compatibility of the shift requested, and the proposed shift is performed upon operation of said control system; and
   if the shift requested manually by the driver is not compatible with the set optimization strategy, a second signal ($S_2$) is generated to transmit a physical return to the driver informing the driver of the incompatibility of the shift requested, and the proposed shift is performed after operation of said control system.

2. A device as claimed in claim 1, wherein said device scrutinizing the shift requested by the driver by means of said control device permits:
   movement of the control device with a minimum amount of effort in the presence of the first signal; and
   movement of the control device, in the presence of the second signal, with greater effort than that required in the presence of the first signal.

3. A device as claimed in claim 1, wherein said device scrutinizing the shift requested by the driver by means of said control device provides for vibrating the control device in the presence of said first signal or said second signal.

4. A device as claimed in claim 2, wherein said control device comprises at least one lever operated by the driver.

5. A device as claimed in claim 1, wherein the control device comprises at least one button operated by the driver.

6. A device as claimed in claim 4, wherein are provided a return spring for said lever, and an electromagnetic actuator in series with said spring; said actuator, in the presence of the second signal ($S_2$), compressing the spring to increase the resistance to movement of the lever.

7. A device as claimed in claim 6, wherein are provided a return spring for said lever, and a mechanism for preloading said return spring and which is activated in the presence of said second signal.

8. A driver-aid method for shifting gears in an automatic transmission, wherein an automatic operating mode of the automatic transmission provides for shifting automatically by means of an optimization strategy based on information signals;
   manual shifting of the gears of the vehicle by means of a control device being permitted even in said automatic operating mode;
   characterized by comprising the step of scrutinizing the shift requested by the driver:
   a) if the shift requested manually by the driver is compatible with the set optimization strategy, a physical return is transmitted to the driver informing the driver of the compatibility of the shift requested, and the requested shift is then performed; and
   b) if the shift requested manually by the driver is not compatible with the set optimization strategy, a physical return is transmitted to the driver informing the driver of the incompatibility of the shift requested, and the requested shift is then performed.

* * * * *